United States Patent
Judlowe

[15] 3,683,684
[45] Aug. 15, 1972

[54] MEASURING APPARATUS EMPLOYING VARIABLE FREQUENCY TRANSDUCER

[72] Inventor: Stephen B. Judlowe, 47 Sagamore Dr., Murray Hill, N.J. 07971

[22] Filed: Oct. 8, 1970

[21] Appl. No.: 79,020

[52] U.S. Cl. .................. 73/136 A, 73/114, 73/117.3
[51] Int. Cl. ................................................. G01l 3/10
[58] Field of Search ..73/136 A, 117.3, 116, 517 AV, 73/DIG. 1

[56] References Cited

UNITED STATES PATENTS

| | | | |
|---|---|---|---|
| 3,290,930 | 12/1966 | Drinkwater | 73/136 A |
| 3,545,265 | 12/1970 | McIlraith | 73/136 A |
| 3,573,448 | 4/1971 | Valentine | 235/150.52 |

*Primary Examiner*—Jerry W. Myracle

[57] ABSTRACT

Torsion, horsepower, and specific fuel rate measuring apparatus includes vibrating wire transducers secured about the periphery of a coupling shaft. Digital apparatus is provided to generate a pulse train having a frequency proportional to the square of the vibrating wire frequency to develop torsion information. The digital torsion wave train is then employed together with a pulse sequence characterized by a rate dependent upon the rotational shaft speed to generate an asynchronous pulse train having a frequency proportional to the horsepower coupled by the shaft.

A fuel flow transducer generates pulse information which is combined with the horsepower signal to provide a figure of merit characterizing a composite power plan, viz., specific fuel rate defined by the ratio of the useful horsepower output of the plant to the rate at which fuel is consumed by the plant to develop that power.

14 Claims, 4 Drawing Figures

MEASURING APPARATUS EMPLOYING VARIABLE FREQUENCY TRANSDUCER

DISCLOSURE OF INVENTION

This invention relates to electronic instrumentation and, more specifically, to improved apparatus for determining the torque, horsepower and specific fuel rate associated with a coupling shaft and its concomitant driving plant.

Rotating shafts are very commonly employed as a mechanical coupling to convey power from a driving energy source to a driven element, e.g., from a ship's steam turbine or diesel engine to a propeller. In some applications, as for modern tanker vessels, the coupling shaft may be hundreds of feet long and several feet in diameter to couple the great propulsion energy required.

It is desirable to measure the torque and horsepower transmitted by a shaft for several reasons, as to provide a figure of merit characterizing the operational status of the driving plant; the status of the power transmission structure which typically includes shaft-supporting bearings; and also to provide information regarding the driven element.

For relatively small shafts in the inch or several inch diameter category, intermediate load sensing coupling links may be directly inserted in the shaft train to measure the coupling torque which, when multiplied by the shaft rate of rotation provides horsepower information. However, for the huge shaft applications such as discussed above, it is obviously impractical to interrupt the shaft for horsepower metering purposes. Accordingly, for the large shaft applications, torsion sensing strain gauges or other transducer forms have been mounted on the shaft and connected to horsepower determining apparatus either by slip rings, or some form of telemetering link. However, such prior horsepower metering apparatus for large shaft applications has been less than completely satisfactory, such equipment typically employing complex, burdensome, expensive and/or relatively inaccurate and drift-prone analog apparatus to effect the requisite measurement and derived parameter computation.

It is therefore an object of the present invention to provide improved torsion, horsepower and specific fuel rate metering apparatus.

More specifically, an object of the present invention is the provision of the aforesaid apparatus which may be readily constructed, and which provides accurate, repeatable and stable output data.

The above and other objects of the present invention are realized in specific, illustrative horsepower metering apparatus wherein two vibrating wire transducers are secured circumferentially about a power coupling shaft. The transducers when excited exhibit characteristic output oscillation frequencies which vary as the square root of the shaft torsion such that the difference between the square of the transducer frequencies provides a direct measure of shaft torsion corrected for temperature and other environmental effects. The transducer output frequencies are coupled from the shaft to a stationary receiver, as is the shaft rotational speed, via a plurality of signal coupling channels.

The receiver employs digital circuitry for developing two asynchronous digital pulse trains each having a frequency proportional to the square of one of the transducer output frequencies. These two pulse trains are, in turn, operated upon together with the shaft revolution speed pulse sequence to form additional characteristic pulsed waves each providing a pulse encoding of shaft horsepower. The difference is then taken between these latter signals to provide horsepower output information.

In accordance with other aspects of my invention, the horsepower signal may be divided by a measure of the rate of fuel consumption, or fuel flow. In addition, an integration of horsepower may be effected to provide horsepower hour information.

The above and other features, objects and advantages of the present invention are realized in a specific illustrative embodiment thereof, presented hereinbelow in conjunction with the accompanying drawing in which:

FIG. 1 schematically depicts transducer and shaft revolution rate signalling apparatus included on a shaft;

Figure 1:
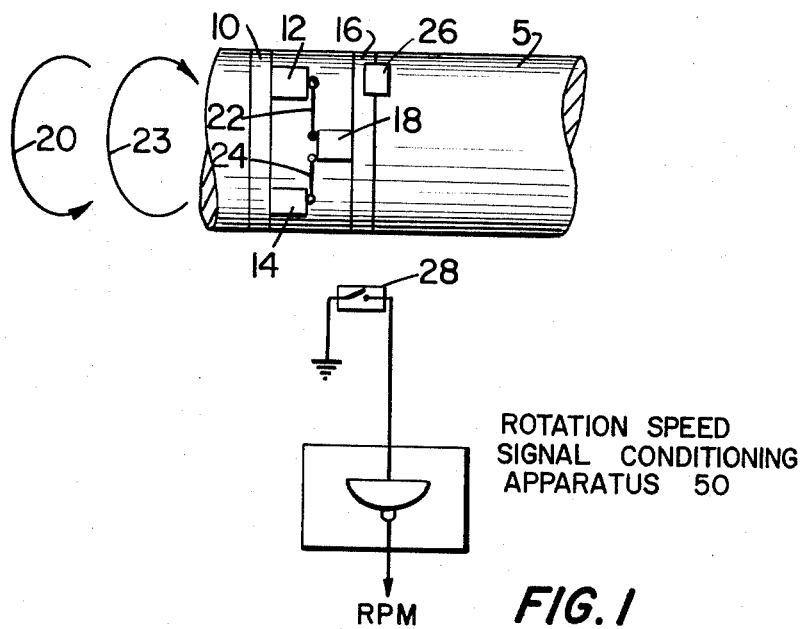

Referring now to FIG. 1, there is shown a section of a power coupling drive shaft 5 employed to convey power from a drive source to a driven element. To determine the torque, or torsion in the shaft at any given time, which directly comprises useful information and as required to determine the several derived quantities such as horsepower and specific fuel rate, two spaced collars 10 and 16 are rigidly secured to the shaft 5, one collar, e.g., the collar 10 having two spaced projections 12 and 14 thereon, and the other collar 16 having an intermediate projection 18.

Two taunt transducer wires 22 and 24 are respectively connected between the projections 12 and 18, and 18 and 14 via standoff elements which electrically insulate the wires from the shaft 5. As discussed below regarding FIG. 2, the wires 22 and 24 are employed to provide feedback couplings for two independent oscillators which excite the transducers, the oscillators thereby providing an electrical output corresponding to the natural resonant frequencies of the wires 22 and 24.

The tension in the wires 22 and 24 is initially adjusted to be substantially equal when no power is applied to the shaft 5 such that the wires 22 and 24 have substantially like resonant frequencies. When power is applied to the shaft 5 in a direction 20 shown in FIG. 1, a corresponding torque is established in the shaft in that direction. Accordingly, the tension (and resonant frequency) in the wire 24 increases, while that in the wire 22 decreases. Conversely, when the shaft 5 couples power in the driven direction 22, the internal torsion in the shaft increases the resonant frequency of the wire 22, and decreases that of the wire 24.

The natural frequency of a taunt vibrated wire varies as the square root of the applied torsion. Thus, the differences between the squares of the resonant wire frequencies provides a direct measure of the torsion in the shaft. The difference between the square of the frequency in either wire 22 or 24 and the square of the frequency of that same wire when no power is applied to the shaft 5 provides complete torque information. However, the two wires are employed to reject common mode signal errors, for example, temperature variations which produce similar effects in the two wires 22 and 24. Further, the two wires essentially provide a doubling of the output frequency shift information.

To provide a measure of the shaft rotational speed, revolution rate signaling apparatus is employed in the arrangement of FIG. 1, such as one or more magnets 26 secured to one of the shaft collars and a stationary reed switch 28 which is activated each time each magnet 26 rotates thereby. The shaft rotational speed, or RPM information is supplied to an RPM pulse conditioning circuit 50 which may comprise, for example, any current sinking logic gate such as a single DTL or TTL gate, or such a gate followed by a one-shot pulse timing network.

Figure 2:
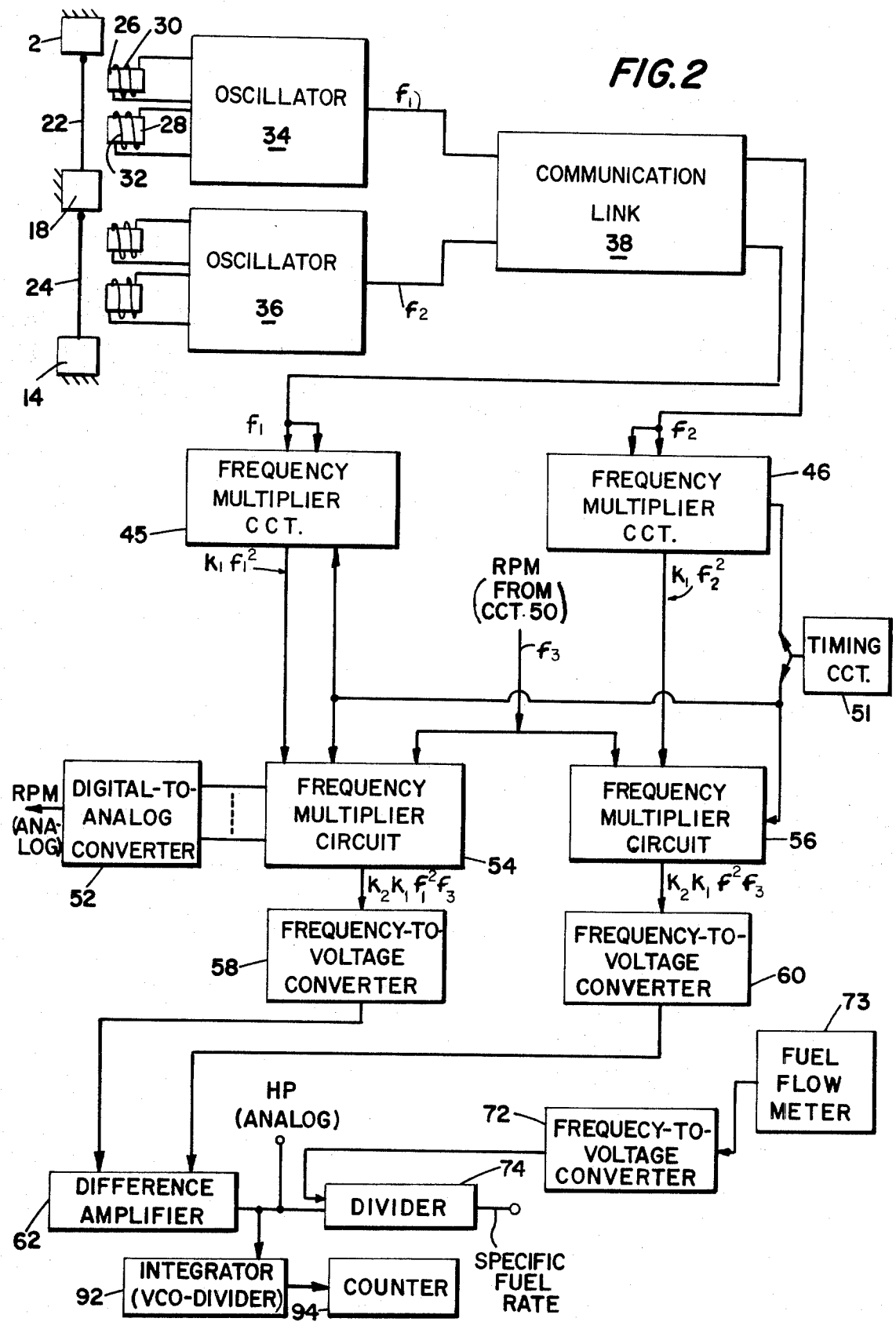
FIG. 2 is a block diagram depicting a data processing system embodying the principles of the present invention.

The system for making use of the vibrating wire information is shown in block form in FIG. 2 and comprises two oscillators 34 and 36 for exciting the wires 22 and 24 for vibration at their natural frequencies. Examining the oscillator 34, also illustrative of the oscillator 36, there is employed first and second electromagnets 26–30 and 28–32. One of the electromagnets e.g., the winding 30 about the ferromagnetic core 26, is employed to excite the wire by providing a wire actuating alternating magnetic field at or about the center of the wire 22. The vibrating wire, in turn, induces an alternating current signal potential in the winding 32 as it cyclically approaches and moves away from the ferromagnetic core 28 and winding 32. Configurations for the oscillator 34 for vibrating the wire 22 are well known. For example, the oscillators 34 and 36 may be of the tickler feedback or other type wherein the winding 30 is connected in the collector circuit of a driving transistor stage, and the winding 32 included in the input or base control circuit for the driver. The oscillators 34 and 36 will automatically operate at the natural frequency of the associated wire 22 or 24 since the wire can provide feedback signals only at that frequency to the feedback winding 32 when pulsed by the winding 30.

The oscillator output frequencies $f_1$ and $f_2$ are coupled to frequency multiplying circuits 45 and 46 via any two channel signal communication link 38, e.g., slip rings coupling signals from the rotating shaft 5 to the stationary receiver, or by way of a telemetering link. The oscillators 34 and 36 will nominally be mounted on the shaft for the telemetering application, and may be included on the stationary receiver and connected as required to the windings 28 and 30 by additional tracks where slip rings are employed.

Figure 3:
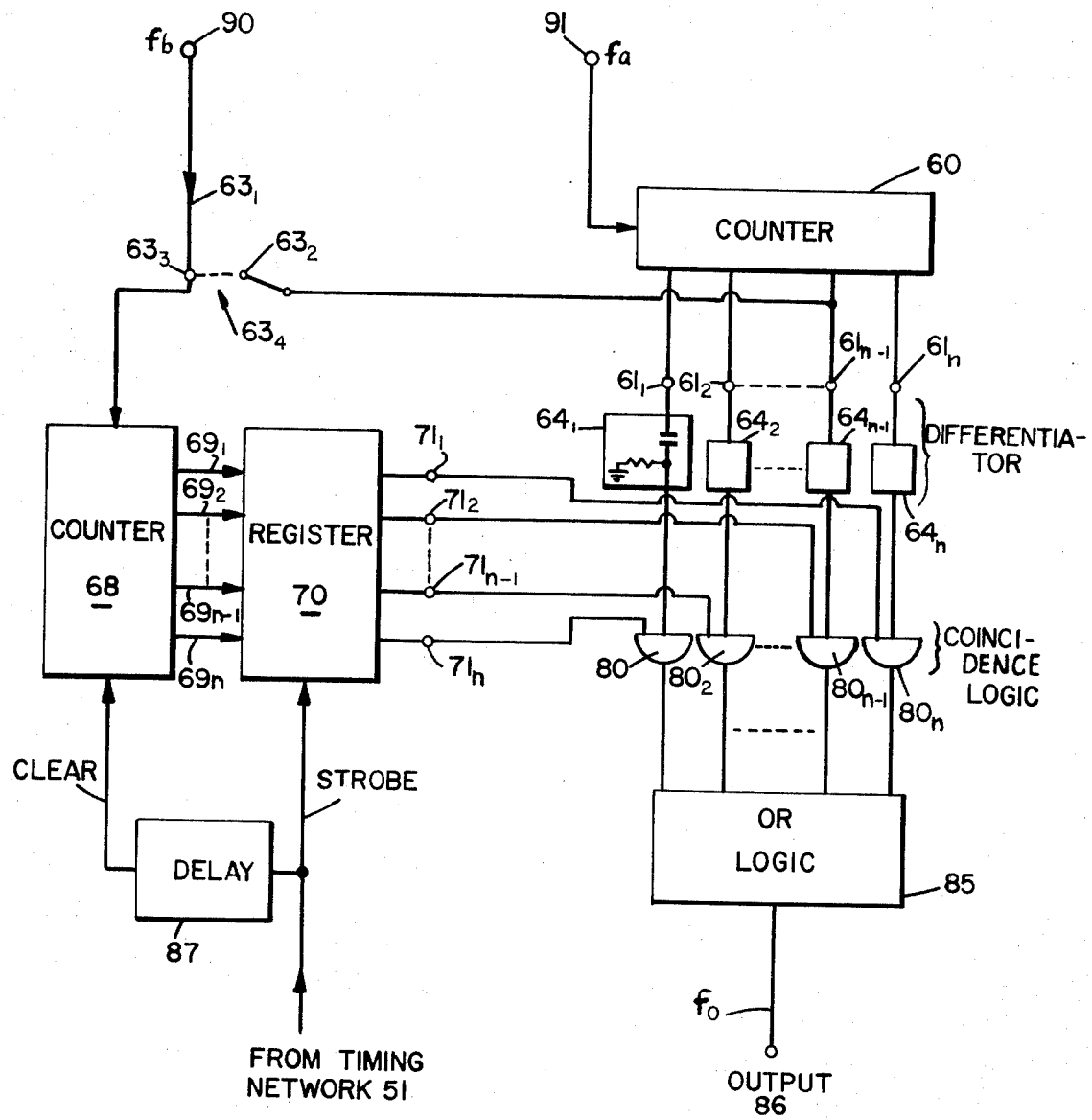
FIG. 3 illustrates frequency multiplying circuitry repeatedly employed in the arrangement of FIG. 2.

Each frequency multiplying circuit 45 and 46 provides an asynchronous output pulse train of an average frequency proportional by the same proportionality factor to the square of the applied input frequency. The structure of the frequency multiplying circuits 45 and 46 is shown in FIG. 3 and is discussed below. It is observed here, however, that the circuitry 45–46 is digital in nature such that repeatable, accurate data processing, free of drift, is effected by these circuits and by the remaining functional elements employed in the FIG. 2 arrangement.

The output pulse train from the frequency multiplying circuit 45 (asynchronous pulses at a rate $K_1 f_1^2$), and the pulse wave from the RPM circuit 50 which occur at the shaft revolution rate or an integral multiple thereof $f_3$, are supplied to a frequency multiplying circuit 54 which generates an asynchronous output pulse train of average frequency $K_2 K_1 F_1^2 f_3$. Correspondingly, the output of the multiplying circuit 46 reacts with the RPM pulse train to form an asynchronous output pulse train of frequency $k_2 k_1 f_2^2 f_3$. The output frequency of each pulsed output from the circuits 54 and 56 embodies complete information to identify shaft horsepower, as does the difference between these frequencies. Either one of these pulse trains may be converted to analog form to provide an analog horsepower indication; the output pulses can be repeatedly counted over a fixed time interval to yield horsepower in digital form; or either technique can be used for each of the data processing channels and the difference between the respective outputs taken to provide the output information. In this latter regard, and as shown in the drawing by way of specific illustration, the output of each frequency multiplying circuit 54–56 is converted to analog form by frequency-to-voltage converters 58 and 60, and the difference between the outputs of the converter 58 and 60 taken by a difference amplifier 62 to develop an analog horsepower signal. Varying structures for the frequency-to-voltage converters 58 and 60 are well known and may comprise, for example, an input pulse timing and regenerating one-shot multivibrator followed by an integrator with a time constant which is long with respect to the input pulse repetition rate; a low pass filter; or as an intermediate signal more fully discussed below, by employing the counter and latch of the FIG. 3 digital multiplier together with a digital-to-analog converter connected to the several register digital outputs. The analog replica of the shaft speed RPM signal may be derived from intermediate digital voltages in the multiplier circuit 54 or 56 by a digital-to-analog converter 52, as will be more clear from the discussion below regarding the multiplier of FIG. 3.

A pulse rate multiplying circuit suitable for use for the functional circuits 45, 46, 54, and 56 of FIG. 2 is shown in FIG. 3, and comprises two input terminals 90 and 91 for receiving either one or two input pulse trains depending upon the circuit application. For the squaring mode of operation desired for the circuits 45 and 46, only a first pulse train of frequency $f_a$ is applied to the terminal 91 and therefrom to the input of an $n$-stage binary counter 60. The pulse trains $f_a$ are also connected to the input of an $n$-stage binary counter 68 which advantageously includes a number of stages identical to that of the counter 60.

The input pulse train at the multiplier terminal 91 may be directly connected to the input of the counter 68. However, to average the horsepower signal over some appreciable time period, to eliminate spurious noise signals, or to limit measuring band width to that of a long interval sampling recorder, e.g., over several seconds or minutes, the input frequency $f_a$ is advantageously scaled down in frequency before being supplied an an input to the counter 68, as from one of the divider stages in the counter network 60 which is otherwise required in any event. When connected in the squaring mode, a jumper $63_4$ connects junction points $63_2$ and $63_3$ to interconnect the counters 60 and 68. The alternate input terminal 90 is simply left unconnected.

The counter network 60 is advantageously of the active, or totem pole output type such that each counter stage exhibits a low source driving impedance when it switches from its low to its high state, as for example, in the readily available monolithic TTL counter configurations.

The output signals from the counter 60 stages at a plurality of counter output terminals $61_1$–$61_n$ are supplied to a corresponding number of differentiator networks 64 which may be formed of a series capacitor and shunt resistor. Accordingly, each time any of the output terminals undergoes a transition from its low to its high voltage state, a positive pulse is generated across the corresponding differentiator resistor.

Listed below is the digital count pattern for an assumed four state counter network 60, it being clear that any number of stages may be employed.

| Table 1 Count State | Output Terminals | | | |
|---|---|---|---|---|
| | $61_4$ | $61_3$ | $61_2$ | $61_1$ |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |
| 16 | 0 | 0 | 0 | 0 |

With reference to Table 1, it is observed that the voltage at one and only one output terminal $61_1$—$61_4$ changes from the binary zero (low) to the one (high) state responsive to each applied input pulse supplied to the terminal 91, except for the last state when the counter is reset from full capacity to the all zero state whereupon no such transition occurs. Moreover, it is observed that eight such transitions occur at the output $61_1$ of the last significant counter stage; four transitions occur at the second least significant terminal $61_3$; two such transitions are present at the second most significant counter terminal $61_{n-1}$, and only one transition for the most significant counter stage terminal $61_n$ for each full counter complement of sixteen input pulses. This 8—4—2—1 pattern follows a binary weighted sequence.

For the squaring mode of operation for the FIG. 3 arrangement, the input pulse train, or a frequency divided replica of the input pulse frequency where time averaging is desired as shown in the drawing, is also supplied to the counter 68. The outputs from the $n$ stages of the counter 68 are connected by conductors 69 to the inputs of a storage register, or latch 70. A strobe pulse is periodically generated by a timing circuit 51 of FIG. 1, e.g., an oscillator or oscillator-divider network, and supplied to the latch 70 to periodically transfer the count state of the counter 68 into the latch. A replica of the strobe pulse passes through a delay element 87 and periodically clears the counter 68 to its all zero state shortly after the strobe signal. The interval between successive counter clearing pulses is made sufficiently short so that the counter cannot overflow from input pulse supplied during that time interval, i.e., so that the counter 68 does not receive more than $2^n$ pulses between successive clear signals for the highest frequency anticipated for the input terminal 91.

The latch is strobed shortly before the counter 68 is cleared. The latch thus stores the highest count state of the counter corresponding to the number of pulses which occur between successive clear pulses. The digital number present at the latch output terminals is thus directly proportional to the frequency of the pulses supplied to the counter 68, the peak count state for the counter 68 increasing or decreasing with like changes for the input wave.

The signals present at the output latch terminals $71_1$–71 and at the output nodes of the differentiators $64_1$–64 are connected to input terminals of $n$ coincidence gates 80 in reverse order of significance, i.e., $61_1$ and $71_n$, $61_2$ and $71_{n-1}$, ..., $61_n$ and $71_1$. That is, the most significant bit, at the latch terminal $71_n$, is connected to the coincidence gate $80_1$ with the output of differentiator $64_1$, associated with the output $61_1$ of the least significant counter 60 stage and so forth, the least significant bit at latch terminal $71_1$ going to a coincidence gate $80_n$ with the most significant output of counter by way of the differentiator $64_n$. The outputs of the several coincidence logic gates 80 are connected through a disjunctive, OR logic gate 85 to the multiplier output terminal 86.

As is apparent, both the digital number present at the output latch terminals 71 and the rate at which pulses are produced by the differentiators 64 directly depend upon the input signal frequency $f_a$. Further the frequency at which pulses occur at the multiplier output 86 depend upon the product of these dependent quantities, the differentiators and counter determining the number of pulses produced per unit of time, and the latch controlling the number of pulses as produced which are allowed to proceed through the coincidence gates 80 to the output terminal 86. For example, if the most significant output bit at terminal $71_n$ of the latch is a digital one, the gate $80_1$ will be fully enabled to switch each time the differentiator $64_1$ provides an output pulse, or every other input pulse. The output pulses from the enabled gate $80_1$, as for all other gates 80, pass through the disjunctive logic gate 85 to the multiplier output terminal 86. If the pulse rate is sufficiently small (less than one-half maximum) such that a low (binary zero) voltage is present at the terminal $71_n$, one-half of all input pulses applied at the input terminal 91 to not give rise to a pulse at terminal 86 since the gate $80_1$ is inhibited. Similarly, a binary one or zero at the terminal $71_{n-1}$ will give rise to the presence or absence of an output pulse for every fourth input pulse, and so forth down to the least significant bit at latch output terminal $71_1$ which cooperates with the coincidence gate $80_n$, differentiator $64_n$, and most significant counter 60 output terminal $61_n$ to control the presence or absence of only a single pulse at the output terminal 86 during a full series of $2^n$ input pulses. Some reflection will show that the output pulse train at terminal 86 thus exhibits a frequency $f_o$ which is proportional to the square of the input pulse wave frequency, i.e., $f_o=kf_a^2$. The constant of proportional $k$ is given by $$k = 1/m \times t/2^n \times 2^{n-1}/2^n,\qquad \text{Equation (1)}$$

where $m$ is the division factor effected by the counter network 60, or the number one if the terminal 91 is directly connected to the input of the counter 68;

$t$ is the time interval between successive clear pulses, and $n$ is the number of stages in the counters 60 and 68, and the latch 70.

To produce pulse train frequency multiplication between different variables as for the circuits 54 and 56, i.e., to operate the multiplier of FIG. 3 in a non-squaring mode, the jumper $63_4$ is deleted. One of the two multiplicand pulse trains, e.g., the output of the squaring circuit 45 or 46, is then connected to one multiplier input 91 while the other multiplicand variable, i.e., the RPM pulse train is connected to the remaining input terminal 90. The circuit operates in a manner discussed above, except that the two factors having a product relationship bearing upon the frequency of the pulse wave at the multiplier output terminal 86, viz., the digital state of the latch 70 and the rapidity at which pulses are distributed in a binary weighted manner at the output of the differentiators 64, are controlled by independent input pulse trains of frequency $f_a$ and $f_o$.

The pattern of digital signals present at the output latch terminals $71_1$—$71_n$ provide a direct measure of the information embodied by the input frequency of the wave supplied to the counter 68. Where, as for the circuit 54 (or 56), this input frequency information comprises RPM data, the digital signals at the latch terminals 71 may be supplied to a digital-to-analog converter (e.g., a ladder or binary-weighted resistor network) to provide an analog RPM signal.

Another important figure of merit beyond horsepower for a propulsion system is specific fuel rate, which indicates the amount of useful power delivered by a power source (horsepower) vis-a-vis the amount of fuel being consumed to generate this power (fuel flow). Specific fuel rate is thus defined to comprise the ratio of these variables. To this end, a fuel rate meter 70, e.g., of the positive displacement type wherein turbine vanes rotate a metering disc at a rate dependent upon the rate of fuel flow in a conduit, may be employed in the system of FIG. 2. The fuel flow meter 70 provides a series of output pulses, often manifested by repetitive contact closures, the rate of which comprises a direct measure of fuel flow. In accordance with the embodiment of the invention shown in FIG. 2, the fuel rate pulses are converted to analog form by a frequency-to-voltage converter 72, and specific fuel rate is computed in an analog divider 74 which determines the horsepower-fuel flow quotient.

Moreover, the total useful ship's propulsion output (horsepower-hours) may be derived by integrating the analog horsepower analog signal. This may be approximated in digital form by driving a voltage controlled oscillator (with optional divider) 92 and horsepower-hour counter 94 with the analog horsepower signal.

Figure 4:
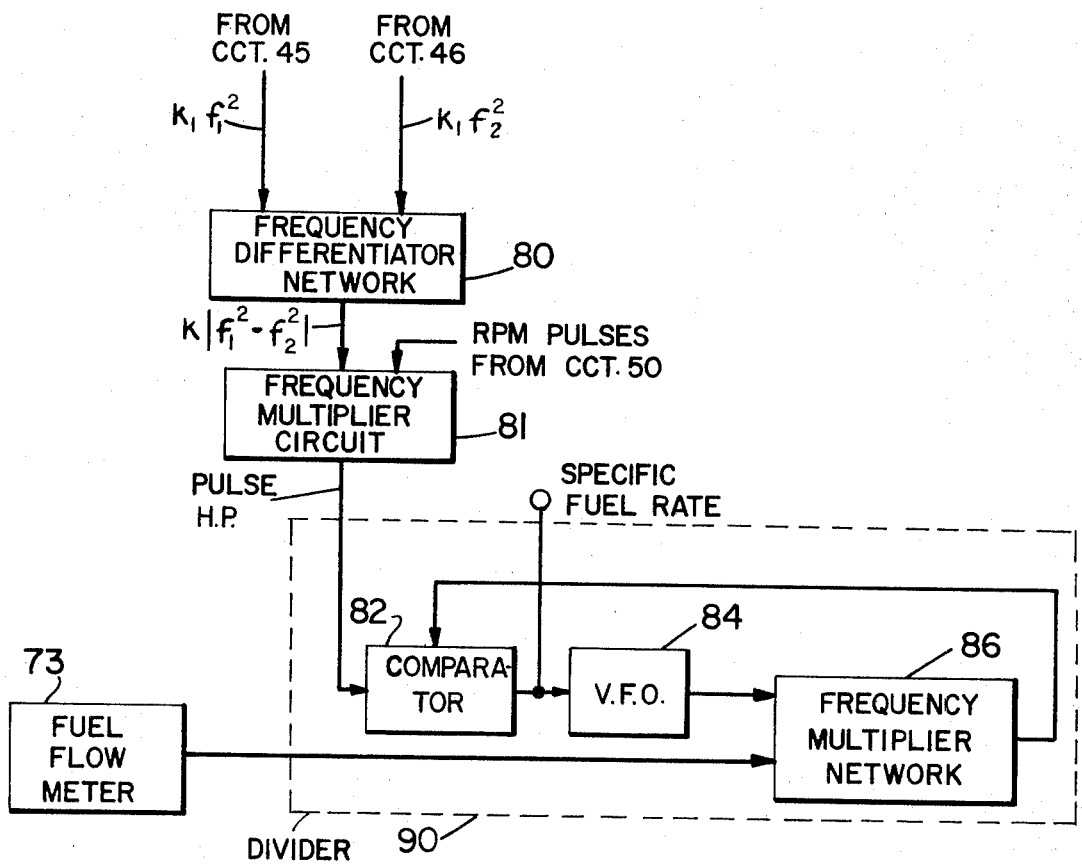
FIG. 4 is a block diagram depicting alternate specific fuel rate determining apparatus.

In accordance with other aspects of my invention and as shown in FIG. 4, horsepower, and specific fuel rate may be computed on a digital basis taking advantage of the pulse train nature of all requisite computation variables. The pulse rates $k$, $f^2$, and $k_2f_2^2$ proportional to the square of the transducer frequencies (torque), as determined by the circuits 45 and 46 of FIG. 2, are supplied as inputs to a frequency difference network 80 of any known type, e.g., a simple flip-flop having set and reset input terminals respectively controlled by the input pulse trains, and whose two output ports selectively partially enable coincidence logic directly supplied with the pulse input trains. The output from the frequency difference network 80 is supplied to a frequency multiplying circuit 81 (as of the FIG. 3 type) together with the RPM pulse train. The circuit 81 performs a function comparable to the circuits 54, 56, 58, 60 and 62 of FIG. 2, viz., generating output information descriptive of horsepower, in this case an output pulse train having a frequency proportional to horsepower, i.e., proportional to the torsion and RPM product.

The pulse horsepower and fuel rate wave trains are supplied to a digital divider 90 which includes a feedback loop comprising a frequency comparator 82, a voltage controlled oscillator 84, and a frequency multiplying network 86 as of the FIG. 3 configuration. The feedback loop of the divider 90 operates to automatically maintain the frequency output of the network 86 essentially at that of the horsepower input pulse train supplied by the circuit 81. To this end, the comparator 82 supplies a control voltage signal to the variable frequency oscillator 84 which directly provides an analog measure of specific fuel rate. In particular, it is apparent that since the frequency multiplying network 86 comprises the product of the fuel rate frequency and the control output of the variable frequency oscillator 84, and since the output of the network 86 is maintained at the horsepower frequency, that the output of the oscillator 84 represents in pulsed form the quotient of the horsepower frequency and fuel flow frequency as desired. A fortiorari, the control voltage input to the variable frequency oscillator 85 provides an analog measure of this information.

The above apparatus thus operates in a reliable manner to compute torsion, horsepower, and specific fuel rate by digital pulse rate techniques, without requiring transducer conversions to digital combinatorial or analog "arithmetic" systems. The arrangement is subject to ready assembly since repetitive use is made of a single frequency multiplying network, and accurate data, limited as a practical matter by that of the sensing transducers, obtains from the avoidance of signal conversions.

The above-described apparatus is merely illustrative of the principles of the present invention. Numerous modifications and adaptations thereof will be readily apparent to those skilled in the art without departing from the spirit and scope of the present invention.

What is claimed is:

1. In combination in apparatus for measuring physical parameters associated with a stressed body having a vibrating wire transducer mounted thereon for providing an output signal which varies in frequency with the applied stress, means for providing an output pulse train having a frequency proportional to the square of the transducer frequency, said frequency square proportional means comprising a first counter having a plurality of stages, means connected to each of said first counter stages for producing an output pulse responsive to a predetermined voltage transition for said counter, a plural stage second counter, means for supplying a measure of the transducer frequency to each of said first and second counters, a plural stage data register, means for periodically gating the contents of said second counter into said data register, means for periodically resetting said second counter after data is transferred from said second counter to said register, a plurality of coincidence logic gates each having inputs connected to a different one of said pulse generating means and to a different stage of said register, said connections for the inputs to the coincidence gates being of an inverse order of significance with respect to the stages of said first counter and the stages of said register, and disjunctive logic means for providing an output pulse responsive to an output signal from any of said coincidence gates, said disjunctive logic means thereby providing a pulse rate of frequency proportional to the stress obtaining in the stressed body.

2. A combination as in claim 1 further comprising frequency-to-voltage converting means connected to the output of said disjunctive logic means for producing an output analog signal.

3. A combination as in claim 1 wherein said counter stages each comprise active, low impedance output driver means for the zero to one state transition, and wherein said pulse producing means connected to each of said first counter stages comprises a differentiator.

4. A combination as in claim 1 wherein the input of said second counter is connected to the output of one of the stages of said first counter, such that the transducer output information is averaged for an extended period of time.

5. In combination in means for measuring parameters associated with a rotating shaft, vibrating wire transducer means secured to said shaft for generating an output signal characterized by a frequency which varies with the torsion present in the shaft, frequency squaring means for producing a pulse train having a frequency proportional to the square of said transducer output frequency, means for developing a pulse train proportional to the rate of rotation of the shaft, and frequency multiplying means for producing an output pulse train having a frequency proportional to the product of said revolution rate pulse train frequency and the frequency of the output pulses generated by said frequency squaring means.

6. A combination as in claim 5, further comprising frequency-to-voltage converting means connected to the output of said frequency multiplying means.

7. A combination as in claim 5 wherein said frequency multiplying means includes register means for storing one input frequency variable in parallel binary form, and further comprising digital-to-analog converter means connected to said register means of said frequency multiplying circuit.

8. A combination as in claim 5 wherein at least one of said frequency squaring means and said frequency multiplying means comprises first and second counters each having a plurality of stages, plural pulse generating means each connected to a different stage of said first counter for generating an output pulse responsive to each zero to one level transition for the associated stage of said first counter, a plural stage latch having a plurality of inputs connected to said second counter, timing means for periodically transferring data from said second counter to said latch and for resetting said latch, plural coincidence logic gates, each having first and second inputs connected to said pulse generating means and to said latch stages in an inverse order of significance, and disjunctive logic means including plural inputs connected to the outputs of each of said coincidence gates.

9. A combination as in claim 5 further comprising additional transducer means secured to the shaft and circumferentially aligned with said transducer means for providing an output signal frequency which varies from a quiescent frequency in a direction opposite to said transducer means, additional frequency squaring means for producing an output pulse train having a frequency proportional to the square of the output frequency of said additional transducer means, and means for providing a horsepower signal comprising means for computing the product of said shaft rate of revolution and the difference in frequencies of the output pulse trains generated by said frequency squaring means and said additional frequency squaring means.

10. A combination as in claim 9 wherein said computing means includes additional frequency multiplying means for producing an output pulse train having a frequency proportional to the product of the frequencies of said revolution rate and the output of said additional frequency squaring means, first and second frequency-to-voltage converters respectively connected to the outputs of said frequency multiplying means and said additional frequency multiplying means, and a difference amplifier connected to the outputs of said frequency-to-voltage converter.

11. A combination as in claim 5 further comprising a fuel flow meter, and divider means having inputs connected to said fuel flow meter and to the output of said frequency multiplying means.

12. A combination as in claim 11 wherein said divider comprises a feedback network including a frequency comparator, frequency multiplying network, and voltage controlled oscillator connected intermediate by said comparator and said frequency multiplying network.

13. In combination in torque metering apparatus, transducer means for generating an output digital signal having a frequency proportional to the square root of torque, and digital wave frequency squaring means coupled to said transducer means for producing an output pulse train having a frequency proportional to the square of said frequency generated by said transducer means, said digital wave frequency squaring means including rate multiplication means.

14. A combination as in claim 13 further comprising plural stage register means, repetitive time interval signaling means, and means including plural stage counter means responsive to signaling from said time interval signaling means for storing a measure of the digital pulses from said wave frequency squaring means, occurring during each timed interval, in said register means.

* * * * *